Figure 1:
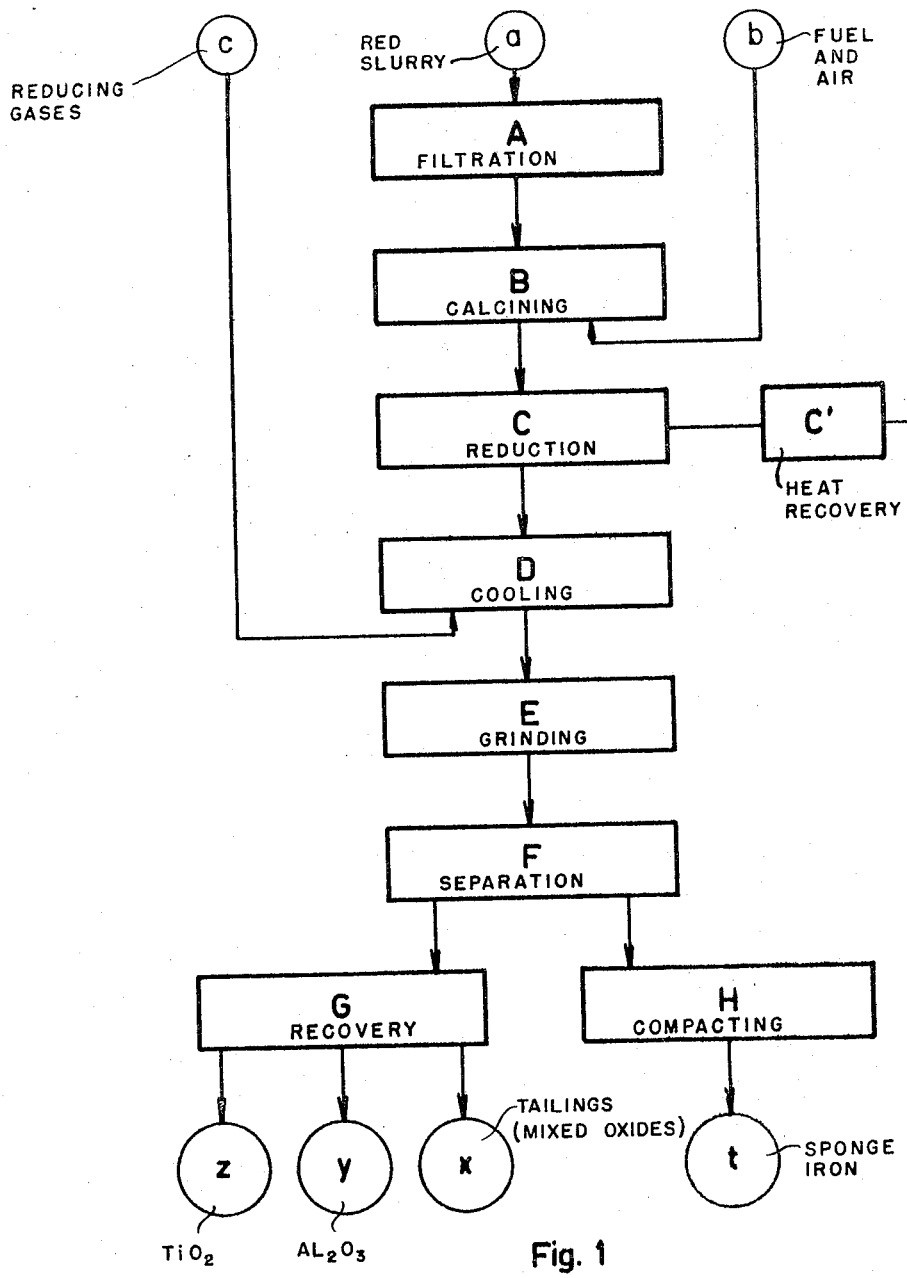

United States Patent Office 3,295,961
Patented Jan. 3, 1967

3,295,961
PROCESS FOR THE PRODUCTION OF IRON SPONGE AND THE RECOVERY OF TITANIUM AND ALUMINUM FROM RED SLURRIES OF BAUXITE
Umberto Colombo and Giuseppe Sironi, Novara, Italy, assignors to Montecatini Societa Generale per l'Industria Mineraria e Chimica, Milan, Italy
Filed Oct. 15, 1963, Ser. No. 316,378
Claims priority, application Italy, Oct. 16, 1962, 20,373/62
7 Claims. (Cl. 75—101)

Our invention relates to the recovery of valuable materials from the by-products of the Bayer bauxite process for the manufacture of aluminum, in which the calcined bauxite is digested with caustic soda solution under pressure, giving a solution of sodium aluminate and leaving a residue of metal oxides, principally the oxides of iron along with small amounts of aluminum and titanium and traces of various other metal oxides. This residue, known as the red slurry, has until recently been considered technologically useless.

The Bayer bauxite red slurries contain from 45 to 55% of iron oxides in more or less hydrated form, 10 to 25% of aluminum oxide and approximately 5 to 10% of titanium oxide, these percentages relating to a dry basis. The slurries themselves, however, usually contain up to 40 to 50% of water. These slurries are present in large amount wherever the Bayer process is used. It is generally estimated that the slurries are equal in volume to the alumina extracted from the bauxite. Because of the large amount of these materials available it is economically necessary to utilize them and to concentrate them.

The prior patent application Serial No. 232,218, filed October 22, 1962, describes a process for recovering iron, aluminum and titanium from the red slurries of bauxite, according to which iron is recovered in the form of a concentrated magnetite ($Fe_3O_4$) after a reducing treatment is carried out in a temperature range of 300 to 750° C. According to that process, aluminum and titanium are recovered from the non-magnetic fraction by successive alkaline or acid leachings, usually after a thermal treatment with sodium and calcium carbonates.

We have now found that it is possible under certain stringent conditions to carry out a reduction on the calcined red slurries until the hematite present therein is transformed completely into metallic iron sponge, and to then separate this iron by utilizing the known magnetic properties thereof. The magnetic separation from the gangue containing aluminum and titanium oxides results in superior products over those obtained by limiting the reduction of the red slurries to the formation of magnetite. Further, the concentrated iron sponge thus obtained is much easier and more economical to utilize than the magnetite since it may be easily compressed into briquettes which may then be directly used for the production of steel in electric furnaces.

It is a prime object of our invention to devise a process which affords obtaining from the Bayer-bauxite-process red slurries: sponge iron suitable for charging electrical furnaces; aluminum oxide; titanium oxide; and concentrated beneficiated tailings containing miscellaneous oxides such as vanadium, gallium, molybdenum and chromium. This object and ancillary objects are achieved by the process of this invention wherein the red slurries, dried to a moisture content of less than 30%, are calcined under fluidized conditions at temperatures below 700° C. in the presence of reducing gases and then transferred into the fluid state to a second fluidized reaction bed wherein the calcined red slurry, now a red powder, is further reduced so that all the $Fe_2O_3$ is reduced almost quantitatively to metallic iron. This second and complete reduction is carried out in a temperature range of 500 to 900° C. The reduced red slurry, now grey in color and a dry powder, is then cooled and subjected to a magnetic separation wherein the iron particles are separated from the non-magnetic materials. The iron may then be compacted to briquettes for whatever use pure iron may be required. The non-magnetic fraction consisting of aluminum, titanium and silicon oxides together with trace oxides is then directly treated with successive alkali and acid attacks to obtain aluminum oxide and titanium oxide. After these treatments, the tailings or final residues consist mainly of silicon; but other minor elements some of which are commercially important are concentrated in these tailings and may be recovered therefrom when economically desirable.

Figure 2:
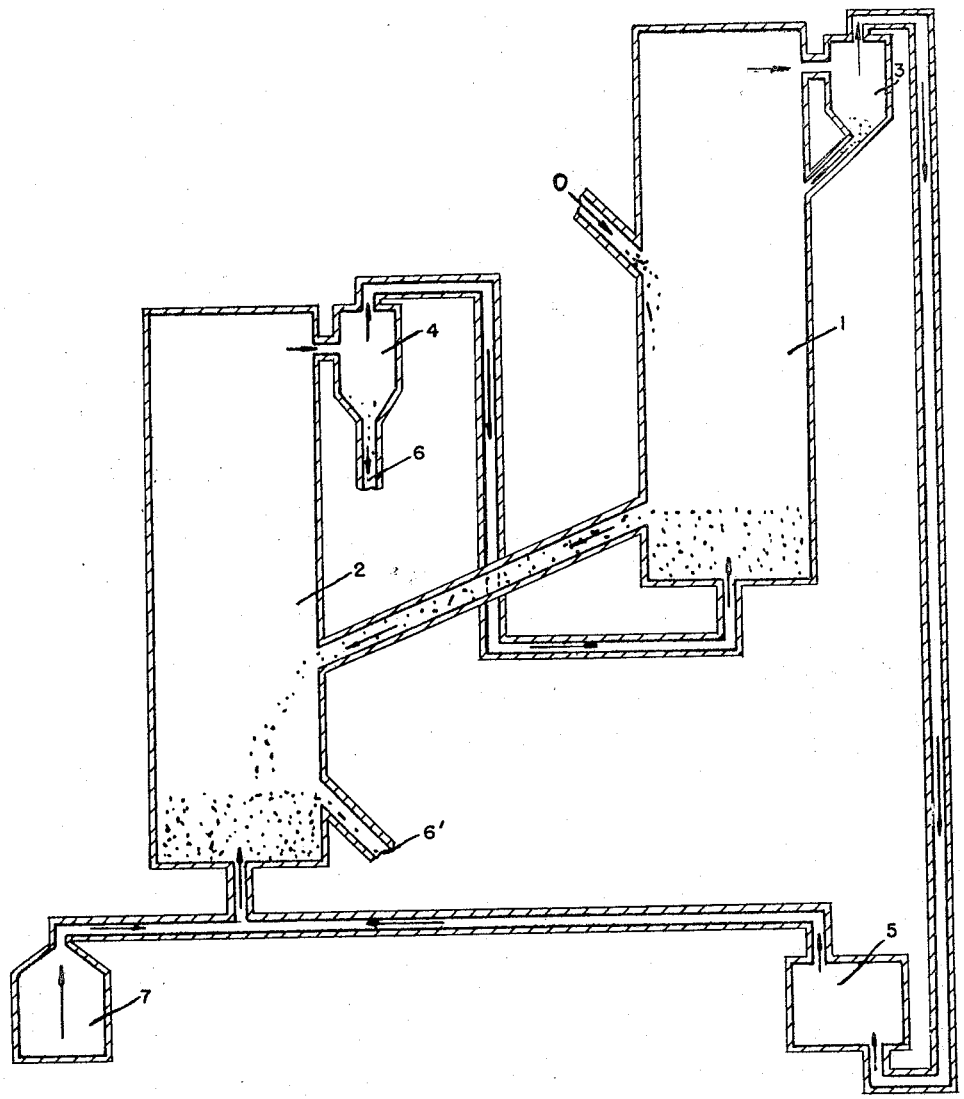

The invention will be further described in conjunction with the drawing in which FIG. 1 is a schematic flow-sheet diagram of the various steps in the process of the invention, and FIG. 2 shows a stainless-steel fluidized-bed apparatus wherein the process of this invention is advantageously carried out.

Referring to FIG. 1, the circles refer to raw materials fed into the process and finished products and residues obtained from the process. The blocks of the schematic flow sheet indicate the various operation of the process of this invention.

The bauxite red slurries, after filtration in the presence of filtrates and removal of some of the excess water until the water content is reduced to less than 30% by weight (operation A), is calcined on a fluidized bed with a hot gas obtained by burning a liquid or gaseous fuel with air so as to obtain the highest thermal efficiency (operation B).

The calcining temperature is kept below 700° C. The calcined product maintained at the calcining temperature passes onto a second fluidized bed which may also be a successive stage in the same calcining furnace, wherein it is reduced by a reducing gas containing at least 30% of hydrogen and carbon monoxide or either one of these reducing gases (operation C). This reducing gas can be obtained by the direct injection into the furnace of a solid, liquid or gaseous fuel together with air or oxygen or by injection through a separate burner. In the latter case, the reducing gas can be subjected to conversion in order to obtain a higher hydrogen or carbon monoxide percentage.

During this operation, the $Fe_2O_3$ obtained in step B is reduced almost quantitatively to metallic iron. The reduction temperature is kept in the range between 500° and 900° C. depending on the composition of the slurries and the reducing gases. The sensible heat and chemical energy available in the exhausted reduction gases are recovered during operation C', and the energy recovered is utilized for operation D. Further it is possible in operation C' to recycle the reducing gas residue after the removal of any water and carbon dioxide resulting from the reduction step.

The reduced iron is then cooled (operation D). A portion of the sensible heat released is utilized for preheating the reduction gases entering the fluidized-bed furnace employed to carry out operation C. The final stage of cooling the reduced material in operation D may be carried out directly by quenching the product in water or indirectly by means of suitable heat exchangers.

The cooled material is ground (operation E) in order to mechanically separate the particles of sponge iron from any metallic oxides that are not reduced during step C.

The grinding is followed by a magnetic separation (operation F) which can be performed in the dry state, or first in the dry state and then on a wet slurry. The magnetic separation process can be carried out completely in the dry state if the particles have a diameter of more than 0.05 mm. Any fines smaller than 0.05 mm. are most conveniently enriched and separated magnetically by a wet process. This is done by first screening the coarse fraction from the fines. The coarse fraction is then separated by the dry process, the fines are slurried in water and the magnetic separation is effected on this slurry. Operation F provides two fractions of which one, consisting of concentrated sponge iron having a total iron content of 90 to 95%, is the magnetic fraction. This magnetic sponge-iron fraction is preferably subjected to briquetting (operation H) and represents the main product of this process.

The non-magnetic fraction resulting from operation F consists of a mixture of aluminum, titanium and silicon oxides together with traces of other oxides which may then all be directly treated in operation G with successive alkaline and acid attacks to obtain aluminum oxide (collected in Y), titanium oxide (collected in X), and a final residue consisting mainly of silica in which other minor elements are present in concentrations about ten times higher than their concentration in the starting red slurry. This fianl residue (collected in Z), if the minor components are of economic interest can be suitably treated to separate and recover these components.

The following advantages accrue from this process. Iron of high purity is recovered from the red slurries which are otherwise of no economic value. The iron recovered is in the form of a concentrated sponge particularly suitable for use in the electric-furnace preparation of steels.

By carrying out the process of this invention, there is provided a multi-stage fluidized-bed calcining and reduction to iron sponge, which is economically applicable and, because of the constant recycling and heat exchange afforded by such a fluidized-bed reaction chamber, permits economic utilization of the heat of the various fuels.

A further advantage of this operation is that it permits recovering almost completely all the aluminum oxide present in the slurry after the magnetic separation of the sponge iron contained in the calcined and reduced product. Further, the aluminum oxide so recovered may then be returned to the Bayer process since the calcining and reduction are carried out at sufficiently low temperatures so that the aluminum oxide is not converted to the insoluble form unsuitable for use in the Bayer process. An additional advantage is that the process permits the recovery of titanium dioxide present in the slurries. The titanium is recovered by an acid leach after the aluminum has been removed from the non-magnetic fraction obtained after the reduction of the calcined slurries. The process offers the further advantage that minor elements contained in the slurries, such as vanadium manganese and chromium, can be recovered from the silica residue obtained after the complete recovery of the iron, aluminum oxide and titanium dioxide.

The following examples illustrate the invention.

*Example 1*

100 kg. of red slurry deriving from the treatment of Gargano (Southern Italy) bauxite according to the Bayer process are used.

The chemical composition of the product after drying in the air is the following one:

|  | Percent |
|---|---|
| $H_2O^-$ | 27.7 |
| $Fe_2O_3$ | 33.5 |
| $Al_2O_3$ | 8.7 |
| $SiO_2$ | 8.3 |
| $TiO_2$ | 5.3 |
| $Na_2O$ | 4.8 |
| $CO_2$ | 1.6 |
| Various metal oxides | 2.2 |

The material is continuously fed by means of an extrusion metering device regulated to a flowrate of 1 kg./minute.

The calcination is carried out with air in a stainless-steel cylindrical furnace (diameter 100 mm., height 3.5 m.) provided with a fluidized bed and a cyclone.

The air introduced into the furnace at the flowrate of 6 Nm.³/h. is heated by methane burning outside the steel tube. The calcining temperature in the fluidized bed is 650° C. The bed of the furnace at the beginning of the test consists of 4 kg. of red slurry previously calcined in an oven at 350° C.

The calcined product is continuously discharged from the bed and the cyclone of the furnace so as to keep the amount of material present on the fluidized bed constant.

At the end of the calcination 64.1 kg. of calcined red slurry the following composition are obtained:

|  | Percent |
|---|---|
| $Fe_2O_3$ | 52.0 |
| $Al_2O_3$ | 13.5 |
| $SiO_2$ | 12.9 |
| $TiO_2$ | 8.2 |
| $Na_2O$ | 7.5 |
| $CO_2$ | 2.5 |
| Various metal oxides | 3.4 |

The calcined red slurries thus obtained are used for the reduction to sponge iron which is carried out again in the fluidized bed. The feeding is carried out by means of a metering device controlled by a hydraulic variator. The flowrate of the metering device is 0.05 kg./minute. The reduction is carried out so as to realize the operating conditions of a two stage furnace in which the two stages work at different temperatures. FIG. 2 of the drawing represents such a device.

For this purpose two stainless-steel cylindrical furnaces 1 and 2 (diameter 100 mm., height 3.5 m.) provided with cyclones 3 and 4 arranged in series are used. The temperature of the fluidized-bed furnace 1 (first stage) to which the calcined red slurries are sent is 700° C. It is kept at this value by external heating.

The height of the furnace bed is 40 cm. In this first stage takes place the almost complete transformation of hematite $Fe_2O_3$ into wustite $Fe_xO$ (in which $x$ is near 1) by the action of the gas leaving the upper end of furnace 1 (second stage). This exhaust gas, after elimination of $CO_2$ and $H_2O$ in scrubber 5, is recycled to the bottom of furnace 2 which represents the second stage.

The partially reduced material is continuously sent by dropping to the fluidized-bed furnace 2 operating at the temperature of 820° C.

The temperature of furnace 2 is kept at the desired value by external heating.

The height of the furnace bed is about 60 cm. In this second stage the reduction of wustite to metallic iron takes place.

The reducing gas from generator 7 and from scrubber 5 is sent to the bottom of furnace 2 at the flowrate of 3.2 Nm.³/h.

From the bed of the second stage 2.4 kg./h. of product reduced to sponge are discharged thru orifice 6. From the cyclone 4, at 6' 0.2 kg./h. are discharged. The time of the reduction to sponge is of 22 hours. The products discharged from the bed and cyclone 6 and 6' (in total 55 kg.) are cooled under a nitrogen current. The discharged product is dry ground to reduce the diameter of the particles to less than 0.15 mm.

The products are then ground and sent to the magnetic separation stage (not shown in the figure) in which they are then subjected to dry magnetic upgrading with a Mörstsell-Sala separator. The concentrated sponge iron (24 kg.) has a total iron content of 92.1%, of which 87.4% consists of metallic iron. The recovery of metal is higher than 94%.

From the non-magnetic fraction 8 kg. of $Al_2O_3$, 5 kg. of $TiO_2$ and 0.2 kg. of other oxides of minor elements are recovered. For the reduction, the second fluidized-bed furnace 2 is fed, with a reducing gas, produced in generator 7, having the following composition:

| | Percent |
|---|---|
| $H_2$ | 65 |
| CO | 34 |
| $CH_4$ | 1 |

This gas after reducing the wustite to sponge iron in furnace 2 then passes to furnace 1 in which it further exerts its heating and reducing action on the hematite. At the outlet from the top of furnace 1 the exhausted gas has the following composition:

| | Percent |
|---|---|
| $H_2$ | 52 |
| CO | 28 |
| $H_2O$ | 14 |
| $CO_2$ | 5 |
| $CH_4$ | 1 |

The water and carbon dioxide are removed at scrubber 5.

*Example 2*

500 kg. of non-calcined red slurry having the composition reported in Example 1 is used. The reduction to sponge is carried out so as to realize the operative conditions in a three-stage furnace in which in the first stage the calcination and reduction of $Fe_2O_3$ to $Fe_3O_4$, in the second stage the reduction of $Fe_3O_4$, to wustite and in the third stage the reduction of wustite to metallic Fe take place.

The non-calcined red slurry is introduced into a fluidized bed stainless-steel furnace (diameter 100 mm., height 3.5 m.) (first stage) provided with a cyclone. (See Example 1 supra.)

The opening of the extrusion feeder is regulated so as to have a flowrate of 0.7 kg./minute.

Through the bottom of the furnace 4 $Nm.^3/h.$ of reducing gas having the following composition are introduced:

| | Percent |
|---|---|
| $H_2O$ | 16 |
| $CO_2$ | 9 |
| $H_2$ | 49 |
| CO | 25 |
| $CH_4$ | 1 |

It is practically the same as the composition of the gas leaving the second reduction stage. The calcining and transformation of $Fe_2O_3$ into $Fe_3O_4$, are carried out at the temperature of 580° C. The temperature is kept at this value by heating the furnace from outside.

Before starting this operation the furnace bed is charged with 5 kg. of red slurry which is reduced under static conditions for 10 minutes.

From the bed and the cyclone 25 kg./h. and 1.5 kg./h. respectively of reduced material (316 kg.) are discharged.

The material is cooled under nitrogen and is then used for the further reduction. At this point the pre-reduced material has the following composition:

| | Percent |
|---|---|
| Total Fe | 37.2 |
| Ferrous Fe | 12.7 |
| $Al_2O_3$ | 13.7 |
| $SiO_2$ | 13.1 |
| $TiO_2$ | 8.3 |
| $Na_2O$ | 7.5 |
| $Co_2$ | 2.5 |
| Various metal oxides | 3.5 |

The gas leaving the furnace top consists of:

| | Percent |
|---|---|
| $H_2O$ | 87 |
| $Co_2$ | 3 |
| $H_2$ | 7 |
| CO | 3 |
| $CH_4$ | Traces |

After purification to remove $CO_2$ and $H_2O$ vapors, it is sent to the third reduction stage.

The calcined and pre-reduced product is introduced into a fluidized bed furnace provided with a cyclone (II stage) by means of a belt feeder whose speed, controlled by a hydraulic variator, allows a flowrate of 0.08 kg./minute. In this second stage the reduction of $Fe_3O_4$ to wustite is carried out by the exhausted gases of the III stage at a temperature of 720° C. This temperature is kept by heating the furnace from outside. The material is continuously discharged by dropping into another fluidized-bed furnace kept in series (III stage) operating at the temperature of 870° C.

The temperature is kept at the desired value by heating the furnace from outside. The reduction of wustite to Fe is carried out by the reducing gas sent to the furnace bottom at the flow rate of 3.8 $Nm.^3/h.$ This gas has the following composition:

| | Percent |
|---|---|
| $H_2$ | 66 |
| CO | 34 |
| $CH_4$ | Traces |

From the bed of this stage 4.5 kg./h. of product reduced to sponge and from the cyclone 0.3 kg./h., are discharged.

The bed product is cooled under nitrogen, ground in a dry mill till the average diameter of the particles is lower than 0.1 mm. and is subjected to magnetic upgrading with a Mörtsell-Sala dry separator while the cyclone product is collected in water and is subjected to wet magnetic separation in a Sala separator.

The sponge iron thus obtained (122 kg.) has a total iron content of 91%, 86% of which consists of metallic iron. The recovery of iron amounts to 92%. The test was completed in 66 hours.

From the non-magnetic fraction aluminum, titanium and minor elements are recovered by means of acid and alkaline attacks.

The above examples are merely illustrative of various aspects of the process of this invention but are not to be considered as limiting the invention in any way since all the materials used are equivalents for materials similarly used in other processes and the apparatus used is a conventional apparatus for the high-temperature handling of fluidized-bed reactions and high-temperature gases.

We claim:

1. The process for the treatment of the red slurries obtained from processing bauxite according to the Bayer process, which comprises the steps of calcining such slurries in a fluidized bed at a temperature below 700° C., reducing to metallic iron the oxides of iron in the calcined material in a fluidized bed at temperatures in the range of 500 to 900° C. in a reducing atmosphere, subdividing the product of said reduction, and magnetically separating the iron in said product from the non-magnetic components.

2. The process for utilizing Bayer-bauxite red slurries which comprises the fluidized calcining of said slurries at temperatures below about 700° C., the fluidized reduction to wustite in a reducing atmosphere at temperatures below about 750° C. of the iron oxides present in said slurry, the fluidized reduction of said wustite to sponge iron at temperatures in the range of 750 to 900° C., and the separation, by magnetic means, of the sponge iron from the non-magnetic residues.

3. The process according to claim 2, wherein the non-magnetic residues are treated with caustic to convert the aluminum oxides contained therein to sodium aluminate which is recovered.

4. The process according to claim 3, wherein the residues after the recovery of the sodium aluminate are treated with concentrated acid to recover the titanium dioxide contained therein.

5. The process according to claim 2, wherein the reduction is achieved by a gaseous reducing agent chosen from the group consisting of carbon monoxide, hydrogen and mixtures thereof.

6. The process according to claim 5, wherein the reducing agent comprises at least 30% by volume of the reducing atmosphere.

7. The process of recovering economically valuable fractions from Bayer-bauxite red slurries, which comprises calcining said slurries, reducing the calcined material in the fluidized state in a gaseous reducing atmosphere at temperatures up to the range of 800 to 900° C., separating the results of the reduction to a magnetic separation to recover metallic iron, treating the non-magnetic residue with caustic to remove the alumina, extracting the caustic-treated residue with acid to recover the titanium dioxide, and freeing the acid-extracted tailings of silica to recover the trace metals from said tailings.

References Cited by the Examiner

UNITED STATES PATENTS

| | | | |
|---|---|---|---|
| 2,767,073 | 10/1956 | Taylor | 75—26 |
| 2,921,848 | 1/1960 | Agarwal | 75—26 |
| 2,932,563 | 4/1960 | Von Haken | 75—26 |
| 2,954,288 | 9/1960 | Atwell | 75—26 |
| 2,991,172 | 7/1961 | Hahn et al. | 75—26 |
| 3,094,378 | 6/1963 | Wolf | 75—101 |
| 3,190,744 | 6/1965 | King | 75—26 |
| 3,211,524 | 10/1965 | Hyde et al. | 75—101 |

DAVID L. RECK, *Primary Examiner.*

HYLAND BIZOT, N. F. MARKVA, *Assistant Examiners.*